US009887789B2

(12) United States Patent
Wu

(10) Patent No.: US 9,887,789 B2
(45) Date of Patent: Feb. 6, 2018

(54) INFORMATION PROCESSING APPARATUS AND INFORMATION PROCESSING METHOD, AND PROGRAM STORING MEDIUM FOR DISTINGUISHING SUFFIXES APPENDED TO CONTENTS DATA

(75) Inventor: Chih-Kuan Wu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 11/488,054

(22) Filed: Jul. 18, 2006

(65) Prior Publication Data

US 2007/0038638 A1 Feb. 15, 2007

Related U.S. Application Data

(63) Continuation of application No. 09/975,847, filed on Oct. 11, 2001, now Pat. No. 7,080,097.

(30) Foreign Application Priority Data

Oct. 12, 2000 (JP) ................................ 2000-311799

(51) Int. Cl.
*G06F 17/30* (2006.01)
*H04H 20/82* (2008.01)

(52) U.S. Cl.
CPC ...... *H04H 20/82* (2013.01); *Y10S 707/99945* (2013.01); *Y10S 707/99948* (2013.01)

(58) Field of Classification Search
None
See application file for complete search history.

(56) References Cited

U.S. PATENT DOCUMENTS 5,412,808 A 5/1995 Bauer
5,418,713 A * 5/1995 Allen ...................... G06F 21/10 348/E7.071
5,664,189 A 9/1997 Wilcox et al.
5,758,068 A * 5/1998 Brandt et al. ................... 726/27
5,889,860 A * 3/1999 Eller et al. ...................... 705/51
5,903,892 A * 5/1999 Hoffert ............. G06F 17/30017
5,933,497 A * 8/1999 Beetcher et al. ............... 705/59
5,940,071 A * 8/1999 Treffers .............. H04N 7/17336 348/E7.073

(Continued)

FOREIGN PATENT DOCUMENTS

JP 11-084510 3/1999
JP 11-146379 5/1999

(Continued)

*Primary Examiner* — Augustine K Obisesan
(74) *Attorney, Agent, or Firm* — Oblon, McClelland, Maier & Neustadt, L.L.P.

(57) ABSTRACT

A click operation is input in a first step, whether or not the target address thereof is an asf file or an m3u file, which are listening contents files, is judged in a second step, and in the event that this is true, in a third step the target file is played without being downloaded. In the event that the target is a different type of file, whether or not the target address thereof is a wma file or an mp3 file, which are downloadable contents files, is judged in a fourth step, and in the event that this is true, in a fifth step the target file is downloaded. In the event that the target is a different type of file, Web browsing is performed in a sixth step, and the processing ends. Thus, contents can be downloaded or samples thereof listened to with a simple operation.

18 Claims, 16 Drawing Sheets

(56) References Cited

U.S. PATENT DOCUMENTS 5,953,005 A * 9/1999 Liu .................. G06F 17/30017 434/307 A
6,014,696 A 1/2000 Araki et al.
6,112,226 A 8/2000 Weaver et al.
6,118,450 A * 9/2000 Proehl ................ H04N 21/4622 348/E5.105
6,182,088 B1 1/2001 Kawakami et al.
6,233,682 B1 * 5/2001 Fritsch .......................... 713/168
6,243,328 B1 * 6/2001 Fenner ................... G11B 17/22
6,248,946 B1 * 6/2001 Dwek ............................. 84/609
6,279,030 B1 8/2001 Britton et al.
6,282,549 B1 * 8/2001 Hoffert ............. G06F 17/30017
6,314,432 B1 11/2001 Potts, Jr.
6,332,146 B1 12/2001 Jebens et al.
6,356,971 B1 * 3/2002 Katz .................... G11B 27/002 710/301
6,385,596 B1 * 5/2002 Wiser et al. .................... 705/51
6,446,080 B1 * 9/2002 Van Ryzin ........ G06F 17/30017
6,519,564 B1 * 2/2003 Hoffberg ........... G06F 17/30743 704/270.1
6,560,618 B1 5/2003 Ims
6,587,127 B1 * 7/2003 Leeke .................. G06Q 20/123 715/733
6,691,149 B1 * 2/2004 Yokota et al. ................ 709/201
6,775,655 B1 * 8/2004 Peinado et al. ................. 705/59
6,810,200 B1 * 10/2004 Aoyama et al. ................ 386/94
7,228,305 B1 * 6/2007 Eyal .................. G06F 17/30029
7,263,497 B1 * 8/2007 Wiser et al. .................... 705/26
7,343,559 B1 * 3/2008 Fujita et al. .................. 715/733
2001/0025255 A1 * 9/2001 Gaudian .......................... 705/26
2002/0002039 A1 * 1/2002 Qureshey et al. ............ 455/344
2002/0010759 A1 * 1/2002 Hitson et al. ................. 709/219
2002/0030745 A1 * 3/2002 Squilla et al. ................ 348/207
2002/0103796 A1 * 8/2002 Hartley ............................. 707/4
2002/0177914 A1 * 11/2002 Chase ............................. 700/94
2002/0194260 A1 * 12/2002 Headley ............ G06F 17/30017 709/203
2003/0112262 A1 * 6/2003 Adatia et al. ................. 345/716
2003/0140121 A1 7/2003 Adams
2005/0235309 A1 * 10/2005 Nathan ........................... 725/25

FOREIGN PATENT DOCUMENTS

JP 11-259971 9/1999
JP 2000-013779 1/2000
JP 2000-134371 5/2000
JP 2000-196547 7/2000
WO WO 98/21679 5/1998
WO WO 00/29990 5/2000
WO WO 0138993 A1 * 5/2001 ....... G06F 17/30017

* cited by examiner

INFORMATION PROCESSING APPARATUS AND INFORMATION PROCESSING METHOD, AND PROGRAM STORING MEDIUM FOR DISTINGUISHING SUFFIXES APPENDED TO CONTENTS DATA

CROSS-REFERENCE TO RELATED APPLICATIONS

This application is a continuation application of, and claims priority to, application Ser. No. 09/975,847 filed Oct. 11, 2001 and claims priority to JP 2000-311799, filed Oct. 12, 2000.

BACKGROUND OF THE INVENTION

1. Field of the Invention

The present invention relates to an information processing apparatus and information processing method, and program storing medium, and particularly relates to an information processing apparatus and information processing method, and program storing medium, wherein contents distributed over networks such as the Internet can be listened to, or downloaded.

2. Description of the Related Art

Conventionally, contents data such as music, movies, etc., has been recorded on recording media such as CDs (Compact Disks) and DVDs (Digital Versatile Disks), and sold to users in such forms. However, in recent years, contents data distribution services which do no use recording media are becoming commonplace, wherein a contents vendor prepares a download site on the Internet, and uses use a personal computer or the like to access the download site of the contents vendor, download desired contents data, and pay the vendor the price of the contents.

The user uses software having browser functions to access the download site (a WWW (World Wide Web) server) of the contents vendor and listen to a sample of desired contents, and in the event that the user likes the contents, the user can download the contents via the Internet. In the case of music data, music data is saved on WWW servers in various compression formats, such as MP3 (MPEG Audio Layer-3), ATRAC (Advanced TRansform Acoustic Coding).

In the event of downloading a file such as contents data from a WWW server, a display window 1 such as shown in FIG. 1 is displayed. The user can check the check button 2 and press the OK button 4 so as to execute the program on the WWW server without receiving the program from the WWW server on the Internet, or can check the check button 3 and press the OK button 4 so as to receive the program from the WWW server on the Internet and save it at a certain location on the hard disk of the user's personal computer.

In the event that the user checks the check button 3 in the state that the display window 1 is displayed, and presses the OK button 4, file downloading starts, and a display window 11 such as shown in FIG. 2 is displayed.

Also, in the event of playing contents data for listening to (e.g., audio data) on the WWW server, the user needs audio data playing application software in addition to the software with browsing functions. In the event that the user has audio data playing application software installed on the personal computer, an audio data playing window 21 such as shown in FIG. 3 is displayed, and audio data is played.

There are applications called "jukebox applications" for managing, playing, or writing from the personal computer to other removable disks, contents data thus downloaded from WWW servers or contents data read into the personal computer from CDs or the like.

However, the user must perform multiple operations such as described above, in order to download contents data from the WWW server or to play contents data on the WWW server without downloading.

The downloaded contents data is written to a certain storage area on the hard disk within the personal computer. In order for the user to manage the downloaded contents data with the jukebox application, the downloaded contents data needs to be moved to a predetermined storage area correlated with the jukebox application. Also, in order to use the jukebox application to play contents data or perform processing for writing the contents data from the personal computer to another removable disk, the downloaded contents data must be registered with the jukebox application (so-called importing processing) according to a predetermined method.

That is to say, complicated operations have been necessary for a user to download contents data from WWW servers and use the data. This has impeded contents distribution services using the Internet from spreading.

SUMMARY OF THE INVENTION

The present invention has been made in light of the above problems, and accordingly, it is an object thereof to enable playing processing for listening to samples of contents data or downloading contents data, without necessitating the user to perform multiple operations.

To this end, the information processing apparatus according to the present invention comprises: input means for receiving input of information from the other information processing apparatus; first display means for displaying a Web page input by the input means; output means for outputting, to the other information processing apparatus, signals corresponding to operation performed by a user with regard to the Web page displayed by the first display means; distinguishing means for distinguishing suffixes appended to contents data input by the input means; playing means for playing the contents data in the event that the distinguishing means distinguishes a suffix of the contents data to be a first suffix; and saving means for saving the contents data and first information relating to the contents data, in the event that the distinguishing means distinguishes a suffix of the contents data to be a second suffix.

The first suffix may be .asf or .m3u, and the second suffix may be .wma or .mp3.

The information processing apparatus may further comprise setting means for setting a storing area for the contents data and the first information saved by the saving means.

Also, the information processing apparatus may further comprise judging means for judging whether or not obtaining second information containing an encryption key for decrypting the contents data is necessary, based on the first information saved by the saving means; and notifying means for notifying the user of the necessity to obtain the second information in order to use the contents data, in the event that judgment is made by the judging means that obtaining the second information is necessary.

Further, the information processing apparatus may further comprise registering means for registering information relating to the contents data saved by the saving means; and second display means for displaying a list of the contents, based on the first information registered by the registering means.

The information processing method according to the present invention comprises: an input step for receiving input of information from the other information processing apparatus; a display step for displaying a Web page input by the processing in the input step; an output step for outputting, to the other information processing apparatus, signals corresponding to operation performed by a user with regard to the Web page displayed by the processing in the display step; a distinguishing step for distinguishing suffixes appended to contents data input by the processing in the input step; a playing step for playing the contents data in the event that a suffix of the contents data is distinguished to be a first suffix by the processing in the distinguishing step; and a saving step for saving the contents data and information relating to the contents data, in the event that a suffix of the contents data is distinguished to be a second suffix by the processing in the distinguishing step.

The program stored in the program storing medium according to the present invention comprises: code for an input step for receiving input of information from the other information processing apparatus; code for a display step for displaying a Web page input by the processing in the input step; code for an output step for outputting, to the other information processing apparatus, signals corresponding to operation performed by a user with regard to the Web page displayed by the processing in the display step; code for a distinguishing step for distinguishing suffixes appended to contents data input by the processing in the input step; code for a playing step for playing the contents data in the event that a suffix of the contents data is distinguished to be a first suffix by the processing in the distinguishing step; and code for a saving step for saving the contents data and information relating to the contents data, in the event that a suffix of the contents data is distinguished to be a second suffix by the processing in the distinguishing step.

With the information processing apparatus, information processing method, and program stored in a program storing medium, according to the present invention, information is input from another information processing apparatus, an input Web page is displayed, signals corresponding to operations made by the user with regard to the displayed Web page are output to the other information processing apparatus, the suffix of the input contents data is distinguished, and in the event that the suffix of the contents data is distinguished as being a first suffix, the contents data is played, while in the event that the suffix of the contents data is distinguished as being a second suffix, the contents data and information relating to the contents data is saved.

DESCRIPTION OF THE PREFERRED EMBODIMENTS

An embodiment of the present invention will be made with reference to the figures.

Figure 1:
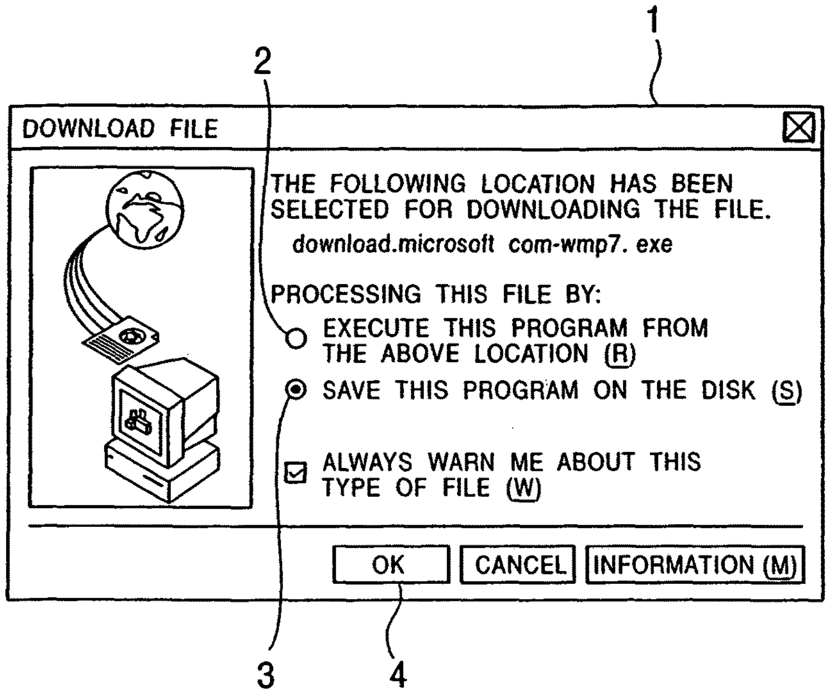
FIG. 1 is a diagram for describing downloading files.
Figure 2:
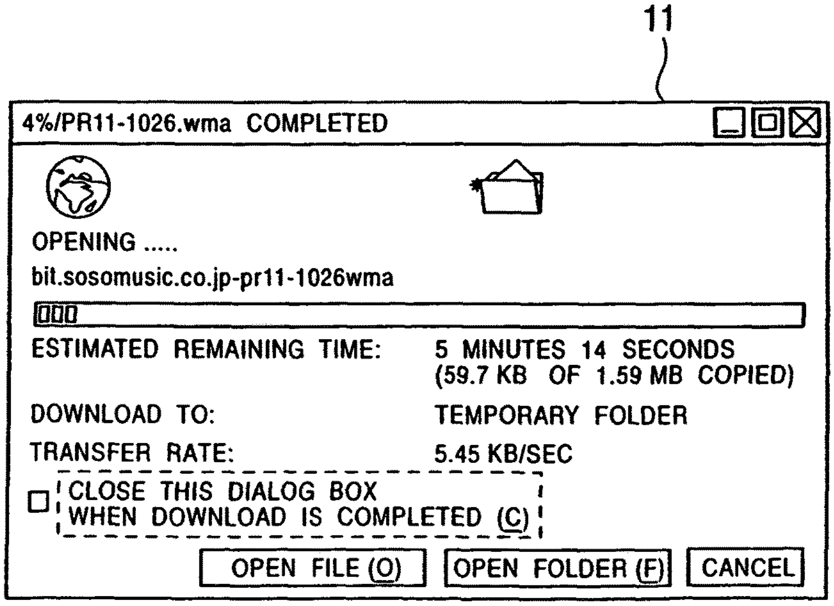
FIG. 2 is a diagram for describing downloading files.
Figure 3:
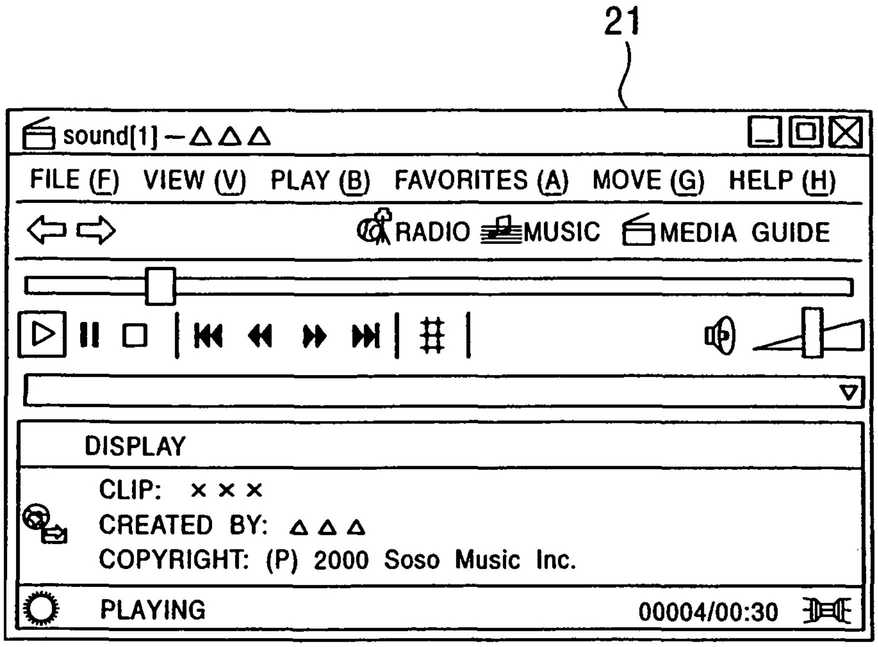
FIG. 3 is a diagram for describing playing downloaded music data.
Figure 4:
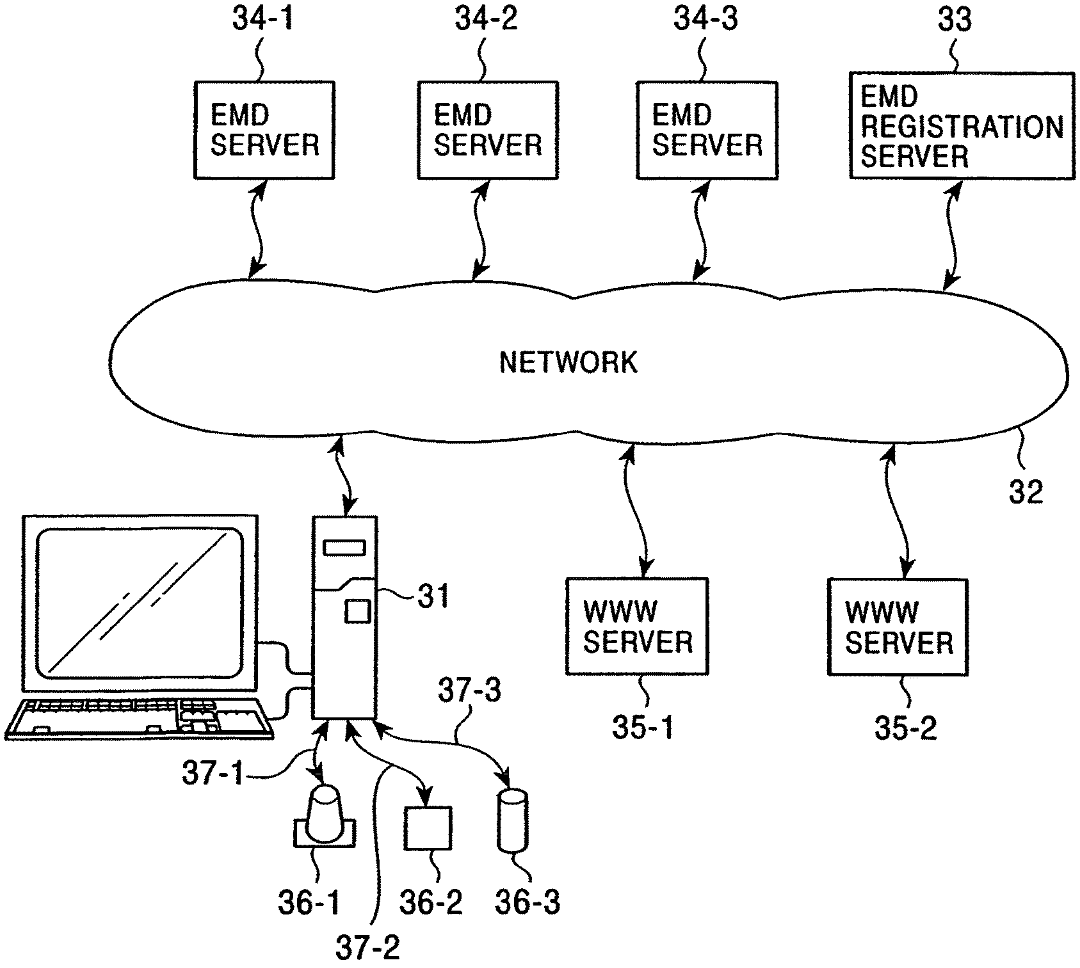
FIG. 4 is a diagram for describing a contents data distribution system wherein the present invention has been applied.

FIG. 4 is a diagram illustrating an embodiment of the contents data distribution system according to the present invention. A personal computer 31 is connected to a network 32 comprising a Local Area Network, the Internet, or the like. The personal computer 31 takes music data received from EMD (Electrical Music Distribution) servers 34-1 through 34-3 or read from a CD (Compact Disk) as described later (such music data will hereafter be referred to as "contents") and converts the contents into a predetermined compression format (e.g., ATRAC3 (Registered Trademark)) and also encrypts the contents with an encrypting format such as DES (Data Encryption Standard) and then records the contents.

The personal computer 31 records usage conditions data indicating usage conditions of the contents, corresponding to the contents recorded as encrypted data.

The usage conditions data indicates, for example, the number of portable devices (hereafter also referred to simply as "PDs") which can simultaneously use the contents corresponding to the usage conditions data (the number of PDs which can check-out, as described later). Even in the event that there has been check-out of the contents to the number of times indicated in the usage conditions data, the personal computer 31 is capable of playing the contents.

Also, the usage conditions data indicates that copies can be made. In the event that the contents are copied to the portable devices 36-1 through 36-3, the personal computer 31 is still capable of playing the contents recorded therein. The number of times that the contents can be recorded to the portable devices 36-1 through 36-3 may be restricted. In this case, the number of times that copies can be made never increases.

Also, the usage conditions data indicates whether or not the contents can be moved to another personal computer, and so forth. After the contents are moved to the portable devices 36-1 through 36-3, the contents recorded in the personal computer 31 cannot be used any more (either the contents are deleted, or the usage conditions are changed so that the contents are no longer usable).

The personal computer 31 stores the contents which are recorded in an encrypted state along with the data relating to the contents (i.e., music piece title, playing conditions, etc.)

to the portable device 36-1 that is connected thereto via a USB (Universal Serial Bus) cable 37-1, and also updates the usage conditions data corresponding to the stored contents in accordance with the storing of the contents in the portable device 36-1 (hereafter referred to as "check-out"). More specifically, in the event of check-out, the number of times that check-out can be performed in the usage conditions data corresponding to the contents recorded in the personal computer 31 is decremented by 1. When the number of times that check-out can be made reaches zero, the corresponding contents cannot be checked-out.

The personal computer 31 stores the contents which are recorded in an encrypted state along with the data relating to the contents to the portable device 36-2 that is connected thereto via a USB cable 37-2, and also updates the usage conditions data corresponding to the stored contents in accordance with the storing of the contents in the portable device 36-2. The personal computer 31 stores the contents which are recorded in an encrypted state along with the data relating to the contents to the portable device 36-3 that is connected thereto via a USB cable 37-3, and also updates the usage conditions data corresponding to the stored contents in accordance with the storing of the contents in the portable device 36-3.

Also, the personal computer 31 causes the portable device 36-1 connected thereto via the USB cable 37-1 to delete (or render unusable) the contents which the personal computer 31 has checked-out to the portable device 36-1, and updates the usage conditions data corresponding to the deleted contents (hereafter referred to as "check-in"). More specifically, at the time of check-in, the number of times that check-out can be performed for the data, described in the usage conditions corresponding to the contents recorded in the personal computer 31, is incremented by 1.

The personal computer 31 causes the portable device 36-2 connected thereto via the USB cable 37-2 to delete (or render unusable) the contents which the personal computer 31 has checked-out to the portable device 36-2, and updates the usage conditions data corresponding to the deleted contents. The personal computer 31 causes the portable device 36-3 connected thereto via the USB cable 37-3 to delete (or render unusable) the contents which the personal computer 31 has checked-out to the portable device 36-3, and updates the usage conditions data corresponding to the deleted contents.

The personal computer 31 cannot check-in contents checked-out to the portable device 36-1 by another personal computer not shown in the drawings. The personal computer 31 cannot check-in contents checked-out to the portable device 36-2 by another personal computer. The personal computer 31 cannot check-in contents checked-out to the portable device 36-3 by another personal computer.

At the time of the personal computer 31 starting to obtain contents from the EMD servers 34-1 through 34-3, in response to a request from the personal computer 31 the EMD registration server 33 transmits to the personal computer 31 via the network 32 a verification key necessary for mutual verification between the personal computer 31 and the EMD servers 34-1 through 34-3, and also transmits to the personal computer 31 a program for connecting to the EMD servers 34-1 through 34-3.

In response to a request from the personal computer 31, the EMD server 34-1 supplies contents to the personal computer 31 along with data relating to the contents (e.g., music piece title, playing restrictions, etc.), via the network 32. In response to a request from the personal computer 31, the EMD server 34-2 supplies contents to the personal computer 31 along with data relating to the contents, via the network 32. In response to a request from the personal computer 31, the EMD server 34-3 supplies contents to the personal computer 31 along with data relating to the contents, via the network 32.

The contents which the EMD servers 34-1 through 34-3 supply are compressed by the same compression method or differing compression methods. The contents which the EMD servers 34-1 through 34-3 supply are encrypted by the same encryption method or differing encryption methods.

In response to a request of the personal computer 31, a WWW (World Wide Web) server 35-1 supplies, via the network 32, data corresponding to a CD from which contents are read (e.g., CD album title, CD record company, etc.) and data corresponding to the contents read from a CD (e.g., music piece title, name of composer, etc.), to the personal computer 31. In response to a request of the personal computer 31, a WWW server 35-2 supplies, via the network 32, data corresponding to a CD from which contents are read and data corresponding to the contents read from a CD, to the personal computer 31.

The portable device 36-1 stores the contents supplied from the personal computer 31 (i.e., check-out contents) along with data relating to contents (e.g., music piece title, playing restrictions, etc.). The portable device 36-1 plays the stored contents based on the data relating to the contents, and outputs the contents to an unshown headphone set or the like.

For example, in the event that a user attempts to play contents a number of times exceeding the number of playing times which is playing restrictions stored as data relating to the contents, the portable device 36-1 stops playing of the corresponding contents. In the event that a user attempts to play contents after expiration of the playing period which is playing restrictions stored as data relating to the contents, the portable device 36-1 stops playing of the corresponding contents.

The user can remove the portable device 36-1 storing the contents from the personal computer 31 carry the portable device 36-1, and further play the contents stored therein so that music or the like corresponding to the contents can be listened to through headphones or the like.

The portable device 36-2 stores the contents supplied from the personal computer 31 along with data relating to contents. The portable device 36-2 plays the stored contents based on the data relating to the contents, and outputs the contents to an unshown headphone set or the like. The user can remove the portable device 36-2 storing the contents from the personal computer 31 carry the portable device 36-2, and further play the contents stored therein so that music or the like corresponding to the contents can be listened to through headphones or the like.

The portable device 36-3 stores the contents supplied from the personal computer 31 along with data relating to contents. The portable device 36-3 plays the stored contents based on the data relating to the contents, and outputs the contents to an unshown headphone set or the like. The user can remove the portable device 36-3 storing the contents from the personal computer 31 carry the portable device 36-3, and further play the contents stored therein so that music or the like corresponding to the contents can be listened to through headphones or the like.

In the following description, the portable devices 36-1 through 36-3 will be referred to simply as portable device 36, unless there is the need to distinguish between the individual portable devices 36-1 through 36-3.

Figure 5:
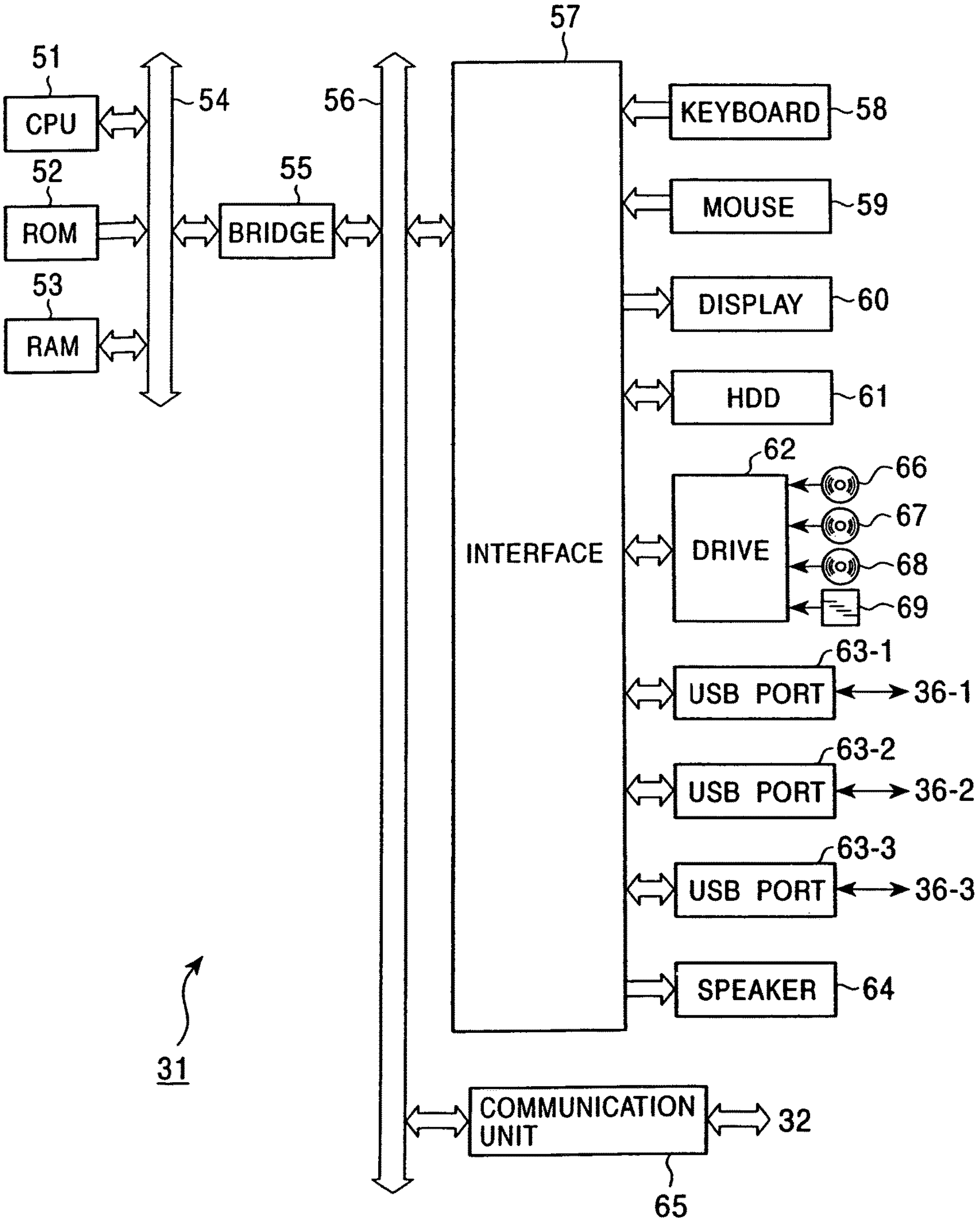
FIG. 5 is a block diagram illustrating the configuration of the personal computer shown in FIG. 1.

FIG. 5 is a diagram describing the configuration of the personal computer 31. A CPU (Central Processing Unit) 51 performs the actual execution of various application programs (e.g., jukebox application programs) for realizing the later-described functions and the Operating System. ROM (Read-Only Memory) 52 generally stores, of the programs used by the CPU 51 and parameters used for computation, the fixed data. RAM (Random-Access Memory) 53 stores programs used for executing by the CPU 51 and parameters which change according to the execution thereof. These are mutually connected by a host bus 54 configured of a CPU bus or the like.

The host bus 54 is connected to an external bus 56 such as a PCI (Peripheral Component Interconnect/Interface) bus or the like via a bridge 55.

A keyboard 58 is operated by the user when inputting various instructions to the CPU 51. A mouse 59 is operated by the user when pointing instructions or selections on the screen shown on a display 60. The display 60 comprises a liquid crystal display device or CRT (Cathode Ray Tube) or the like, for displaying various types of information in text and images. A HDD (Hard Disk Drive) 61 drives hard disks, and records programs to be executed by the CPU 51 and information (e.g., downloaded contents data) therein and reproduces the programs and information therefrom.

A drive 62 reads out data or programs recorded on magnetic disks 66, optical disks (including CDs) 67, magneto-optical disks 68, or semiconductor memory 69, which are mounted as necessary, and supplies the data or programs to RAM 53 which is connected thereto via an interface 57, the external bus 56, the bridge 55, and the host bus 54.

The portable device 36-1 is connected to the USB (Universal Serial Bus) port 63-1 via a predetermined cable. The USB port 63-1 outputs to the portable device 36-1 data (e.g., contents, commands for the portable device 36-1, and so forth) supplied from the CPU 51, RAM 53, or HDD 61, via the interface 57, external bus 56, bridge 55, or host bus 54.

The portable device 36-2 is connected to the USB port 63-2 via a USB cable. The USB port 63-2 outputs to the portable device 36-2 data (e.g., contents, commands for the portable device 36-2, and so forth) supplied from the CPU 51, RAM 53, or HDD 61, via the interface 57, external bus 56, bridge 55, or host bus 54.

The portable device 36-3 is connected to the USB port 63-3 via a USB cable. The USB port 63-3 outputs to the portable device 36-3 data (e.g., contents, commands for the portable device 36-3, and so forth) supplied from the CPU 51, RAM 53, or HDD 61, via the interface 57, external bus 56, bridge 55, or host bus 54.

A speaker 64 outputs predetermined audio corresponding to contents, based on data or audio signals supplied from the interface 57.

The keyboard 58, mouse 59, display 60, HDD 61, drive 62, USB ports 63-1 through 63-3, and speaker 64, are connected to the interface 57, and the interface 57 is connected to the CPU 51 via the external bus 56, bridge 55, and host bus 54.

A communication unit 65 has a network 32 connected thereto, for storing data supplied from the CPU 51 or HDD 61 (e.g., a registration request, a request for transmitting contents, etc.) in packets of a predetermined format which are then transmitted via the network 32, and also for outputting data (e.g., verification keys, contents, etc.) stored in packets received via the network 32 to the CPU 51, RAM 53, or HDD 61.

The communication unit 65 is connected to the CPU 51 via the external bus 56, bridge 55, and host bus 54.

Figure 6:
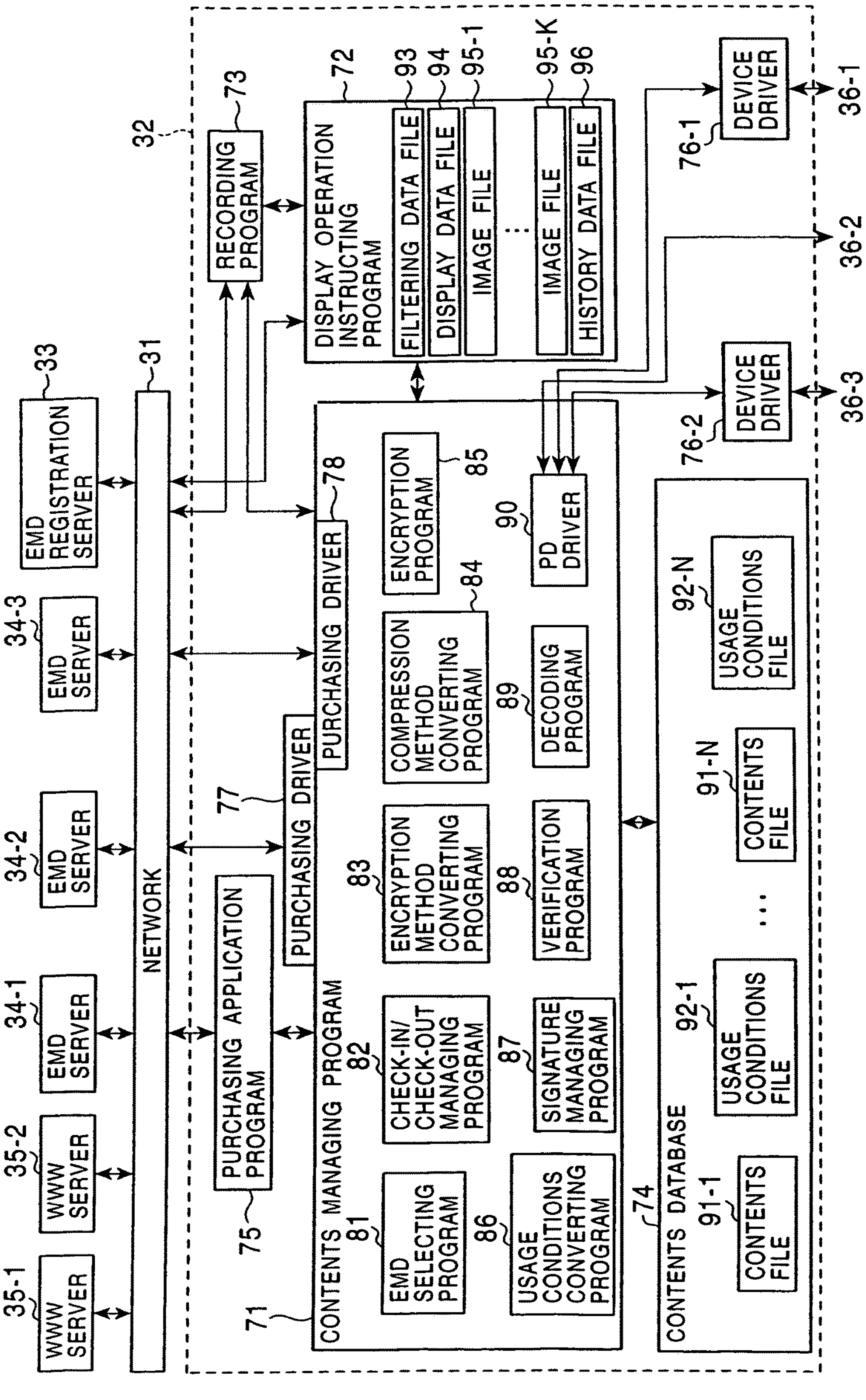
FIG. 6 is a functional block diagram of a state wherein a jukebox application program is activated on the personal computer shown in FIG. 5.

FIG. 6 is a block diagram describing the configuration of the functions of the personal computer 31 realized by the jukebox application program being loaded to the RAM 53 and executed by the CPU 51. A contents managing program 71 is configured of multiple programs, such as an EMD selecting program 81, a check-in/check-out managing program 82, an encryption method converting program 83, compression method converting program 84, an encryption program 85, a usage conditions converting program 86, a signature managing program 87, a verification program 88, a decoding program 89, a PD driver 90, a purchasing driver 77 and a purchasing driver 78, and so forth.

The contents managing program 71 is described with shuffled instructions or encrypted instructions or the like, for example, so as to hide the processing contents thereof from the outside, thereby making it difficult to comprehend the processing contents thereof (e.g., even in the event that the user directly reads out the contents managing program 71, the instructions thereof cannot be identified).

The EMD selecting program 81 is not contained in the contents managing program 71 when the contents managing program 71 is installed in the personal computer 31, and is received from the EMD registering server 33 via the network 32 during the EMD registration process. The EMD selecting program 81 selects a connection with one of the EMD servers 34-1 through 34-3, and causes either a purchasing application 115 or the purchasing driver 77 or purchasing driver 78 to communicates with one of the EMD servers 34-1 through 34-3 (e.g., downloading contents at the time of purchasing contents).

The check-in/check-out managing program 82 makes check-out of contents stored in contents files 91-1 through 91-N to one of the portable devices 36-1 through 36-3, or makes check-in of contents stored in the portable devices 36-1 through 36-3, based on check-in or check-out settings, and usage conditions files 92-1 through 92-N recorded in the contents database 74.

The check-in/check-out managing program 82 updates the usage conditions data stored in the usage conditions files 92-1 through 92-N recorded in the contents database 74, according to the check-in or check-out processing.

The encryption method converting program 83 converts the encryption method of the contents which the purchasing application program 75 has received from the EMD server 34-1, the encryption method of the contents which the purchasing driver 77 has received from the EMD server 34-2, or the encryption method of the contents which the purchasing driver 78 has received from the EMD server 34-3, via the network 32, into the same encryption method as that of the contents stored in the contents files 91-1 through 91-N recorded in the contents database 74.

The encryption method converting program 83 converts the contents for check-out into an encryption format which the portable device 36-1 or 36-3 can use, at the time of check-out of contents to the portable device 36-1 or 36-3.

The compression method converting program 84 converts the compression method of the contents which the purchasing application program 75 has received from the EMD server 34-1, the compression method of the contents which the purchasing driver 77 has received from the EMD server 34-2, or the compression method of the contents which the purchasing driver 78 has received from the EMD server 34-3, via the network 32, into the same compression method as that of the contents stored in the contents files 91-1 through 91-N recorded in the contents database 74.

Also, the compression method converting program 84 converts the contents for check-out into a compression format which the portable devices 36-1 or 36-3 can use, at the time of check-out of contents to the portable devices 36-1 or 36-3.

The encryption program 85 encrypts contents (not encrypted) read from a CD for example and supplied from the audio recording program 73, with the same encryption method as that of the contents stored in the contents files 91-1 through 91-N recorded in the contents database 74.

The usage conditions converting program 86 converts data indicating usage conditions of contents which the purchasing application program 75 has received from the EMD server 34-1 (i.e., so-called usage rules) via the network 32, data indicating usage conditions of contents which the purchasing driver 77 has received from the EMD server 34-2, and data indicating usage conditions of contents which the purchasing driver 78 has received from the EMD server 34-3, into the same format as that of the usage conditions data stored in the usage conditions files 92-1 through 92-N recorded in the contents database 74.

Also, at the time of check-out of contents to the portable devices 36-1 or 36-3, the usage conditions converting program 86 converts data of usage conditions corresponding to the contents for check-out into data of usage conditions usable by the portable devices 36-1 or 36-3.

Before executing check-in or check-out processing, the signature managing program 87 detects tampering with data of usage conditions, based on a signature contained in the data of usage conditions stored in the usage conditions files 92-1 through 92-N recorded in the contents database 74. The signature managing program 87 updates the signature contained in the data of usage conditions, in accordance with updating of the data of usage conditions stored in the usage conditions files 92-1 through 92-N recorded in the contents database 74 accompanying the check-in or check-out processing.

The verification program 88 executes mutual verification processing between the contents managing program 71 and the purchasing application program 75, and also between the contents managing program 71 and the purchasing driver 77. Also, the verification program 88 stores a verification key used in the mutual verification processing between the EMD server 34-1 and the purchasing application program 75, between the EMD server 34-2 and the purchasing driver 77, and between the EMD server 34-3 and the purchasing driver 78.

The verification key used by the verification program 88 for the mutual verification processing is not stored in the verification program 88 at the time that the contents managing program 71 is installed in the personal computer 31, and is supplied from the EMD registration server 33 and stored in the verification program 88 at the point that registration processing is properly executed by the display operation instructing program 72.

The decoding program 89 decodes the contents stored in contents files 91-1 through 91-N recorded in the contents database 74 at the time of playing the contents on the personal computer 31.

At the time of check-out of certain contents to the portable device 36-2 or check-in of certain contents from the portable device 36-2, the PD driver 90 supplies contents to the portable device 36-2 or commands for the portable device 36-2 to execute predetermined processing.

At the time of check-out of certain contents to the portable device 36-1 or check-in of certain contents from the portable device 36-1, the PD driver 90 supplies contents to the device driver 76-1 or commands for the device driver 76-1 to execute predetermined processing.

At the time of check-out of certain contents to the portable device 36-3 or check-in of certain contents from the portable device 36-3, the PD driver 90 supplies contents to the device driver 76-2 or commands for the device driver 76-2 to execute predetermined processing.

The purchasing driver 77 is a so-called plug-in program, installed along with the contents managing program 71, and is supplied from the EMD registration server 33 via the network 32 or is recorded on a CD and thus supplied. Upon installation to the personal computer 31, the purchasing driver 77 exchanges data with the contents managing program 71 via an interface of a predetermined format which the contents managing program 71 has.

The purchasing driver 77 requests transmission of predetermined contents from the EMD server 34-2 via the network 32, and receives the contents from the EMD server 34-2. Also, at the time of receiving contents from the EMD server 34-2, the purchasing driver 77 executes billing processing.

The purchasing driver 78 is a program installed along with the contents managing program 71, requests transmission of predetermined contents from the EMD server 34-3 via the network 32, and receives the contents from the EMD server 34-3. Also, at the time of receiving contents from the EMD server 34-3, the purchasing driver 78 executes billing processing.

The display operation instructing program 72 displays an image of a predetermined window on the display 60, based on the filtering data file 93, display data file 94, image files 95-1 through 95-K, or history data file 96, and instructs the contents managing program 71 to perform processing such as check-in or check-out, based on operations of the keyboard 58 or mouse 59.

The filtering data file 93 stores data for weighting each of the contents stored in the contents files 91-1 through 91-N recorded in the contents database 74, and is recorded on the HDD 61.

The display data file 94 stores data corresponding to the contents stored in the contents files 91-1 through 91-N recorded in the contents database 74, and is recorded on the HDD 61.

The image files 95-1 through 95-K store images corresponding to the contents files 91-1 through 91-N recorded in the contents database 74, or images corresponding to a later-described package, and are recorded on the HDD 61.

In the following description, the image files 95-1 through 95-K will be referred to simply as image file 95, unless there is the need to distinguish between the individual image files 95-1 through 95-K.

The history data file 96 stores history data regarding the number of times of check-out of the contents stored in the contents files 91-1 through 91-N recorded in the contents database 74, the number of times of check-in thereof, the date thereof, etc., and is recorded on the HDD 61.

At the time of registration processing, the display operation instructing program 72 transmits to the EMD registration server 33, via the network 32, the ID of the contents managing program 71 that has been stored beforehand, receives a verification key and EMD selecting program 81 from the EMD registration server 33, and supplies the verification key and the EMD selecting program 81 to the contents managing program 71.

The audio recording program 73 displays a predetermined window image, and reads out data such as the recording time of the contents from the CD which is the optical disk mounted on the drive 62, based on operations at the keyboard 58 or the mouse 59.

The audio recording program 73 requests transmission of data corresponding to a CD (e.g., album title, artist name, etc.) or data corresponding to contents recorded on the CD (e.g., music piece title, etc.) from the WWW servers 35-1 or 35-2 via the network 32, based on the audio recording time and the like of the contents recorded on the CD, and also, receives the data corresponding to the CD or data corresponding to contents recorded on the CD from the WWW servers 35-1 or 35-2.

The audio recording program 73 supplies the data corresponding to the CD or data corresponding to contents recorded on the CD that has been received to the display operation instructing program 72.

Also, in the event that audio recording instructions are input, the audio recording program 73 reads out contents from the CD which is the optical disk 67 mounted to the drive 62, and outputs the contents to the contents managing program 71.

The contents database 74 stores contents that have been supplied from the contents managing program 71, compressed by a predetermined method, and encrypted with a predetermined method, to one of the contents files 91-1 through 91-N (record on the HDD 61). The contents database 74 stores data regarding usage conditions corresponding to the contents stored in each of the contents files 91-1 through 91-N to one of the usage conditions files 92-1 through 92-N corresponding to the contents files 91-1 through 91-N storing the contents (i.e., records to the HDD 61).

The contents database 74 may record the contents files 91-1 through 91-N or the usage conditions files 92-1 through 92-N as records.

For example, usage conditions data corresponding to the contents stored in the contents file 91-1 is stored in the usage conditions file 92-1. The usage conditions data corresponding to the contents stored in the contents file 91-N is stored in the usage conditions file 92-N.

In the following description, the contents files 91-1 through 91-N will be referred to simply as contents file 91, unless there is the need to distinguish between the individual contents files 91-1 through 91-N. In the same say, in the following description, the usage conditions files 92-1 through 92-N will be referred to simply as usage conditions file 92, unless there is the need to distinguish between the individual usage conditions files 92-1 through 92-N.

Figure 7:
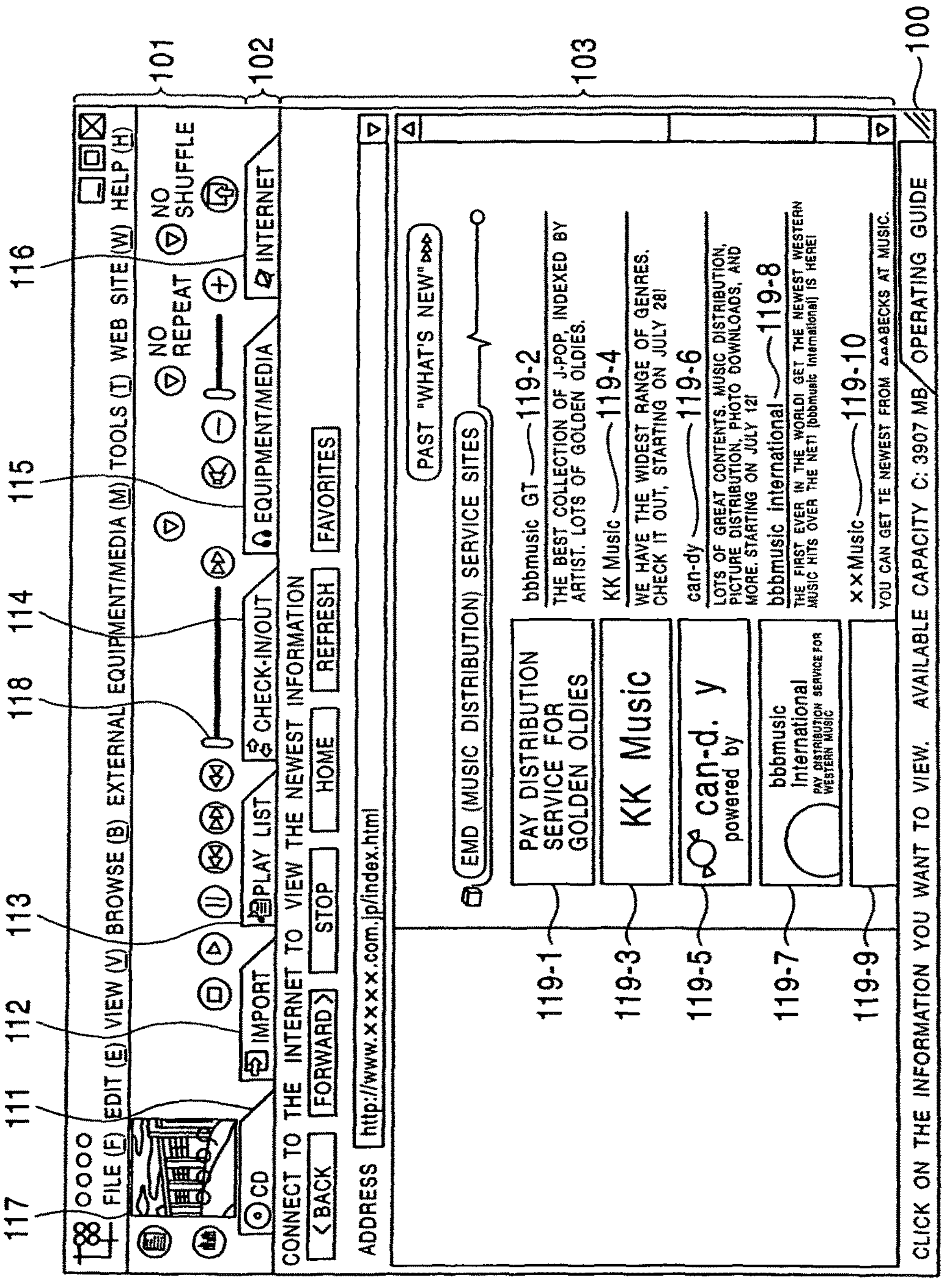
FIG. 7 is a diagram for describing the display window of the jukebox application program.

FIG. 7 is a diagram illustrating an example of a display window displayed on the display 60 in the event that a jukebox application program to which the present invention is applied is loaded to the RAM 53 and activated, and the user attempts to download contents data from one of the EMD servers 34-1 through 34-3.

The player operating portion 101 in the display window 100 is made up of various types of operating buttons used by the user for playing contents data imported by the jukebox application program. Also, positioned in the player operating portion 101 is a field 117 for displaying images and the like correlated to selected contents, and a lever 118 which moves from the left to the right in the figure according to the playing position of the contents.

The tab switch-over portion 102 is configured of tabs 111 through 116, and the user can perform desired operations by selecting one of the tabs 111 through 116. The tab 111 is selected in the event of performing operations to play contents data recorded on the CD that is mounted on the drive 62. The tab 112 is selected in the event of performing operations to register contents data recorded on the HDD 61 but not registered as contents data managed by the jukebox application program, to the "play list".

The tab 113 is selected in the event of playing contents data registered to the "play list" or collecting desired contents data and editing a "favorites" contents data group and so forth. The tab 114 is selected in the event of performing operations for check-in or check-out of contents data between the "play list" and external equipment or recording media. The tab 115 is selected in the event of performing processing to play contents data recorded in external equipment or recording media. The tab 116 is selected in the event of performing processing to connect to the Internet and download desired contents.

At the tab switch-over portion 102, in the event that the tab 116 is selected, the jukebox application program accesses, for example, a home page wherein many links to music distribution service sites are provided, based on a certain pre-registered URL, and displays the home page on the browser portion 103. The user selects one of the link banners 119-1, 119-3, 119-5, 119-7, or 119-9, or one of the hypertext links 119-2, 119-4, 119-6, 119-8, or 119-10, and thus can jump to the home page of the desired music distribution service site, and purchase contents.

Figure 8:
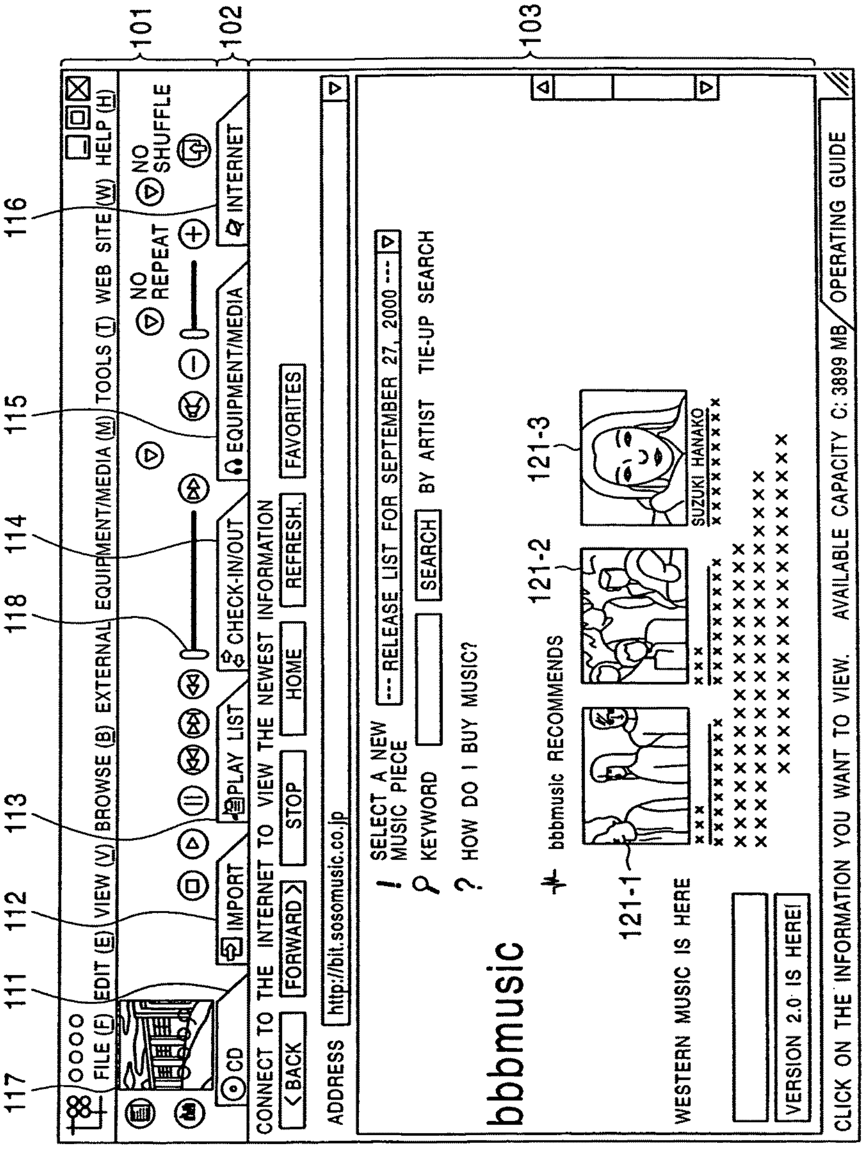
FIG. 8 is a diagram for describing the procedures for purchasing or listening to a sample of the contents data.

In the event that the user selects one of the link banners 119-1, 119-3, 119-5, 119-7, or 119-9, or one of the hypertext links 119-2, 119-4, 119-6, 119-8, or 119-10, the home page of the specified music distribution service site is displayed on the browser portion 103, as shown in FIG. 8. The home page of the music distribution service site has an introduction to contents to be distributed, and the user can obtain detailed information of the contents by selecting one of the images 121-1 through 121-3, or jump to pages for listening to samples of music or instructing downloading.

Figure 9:
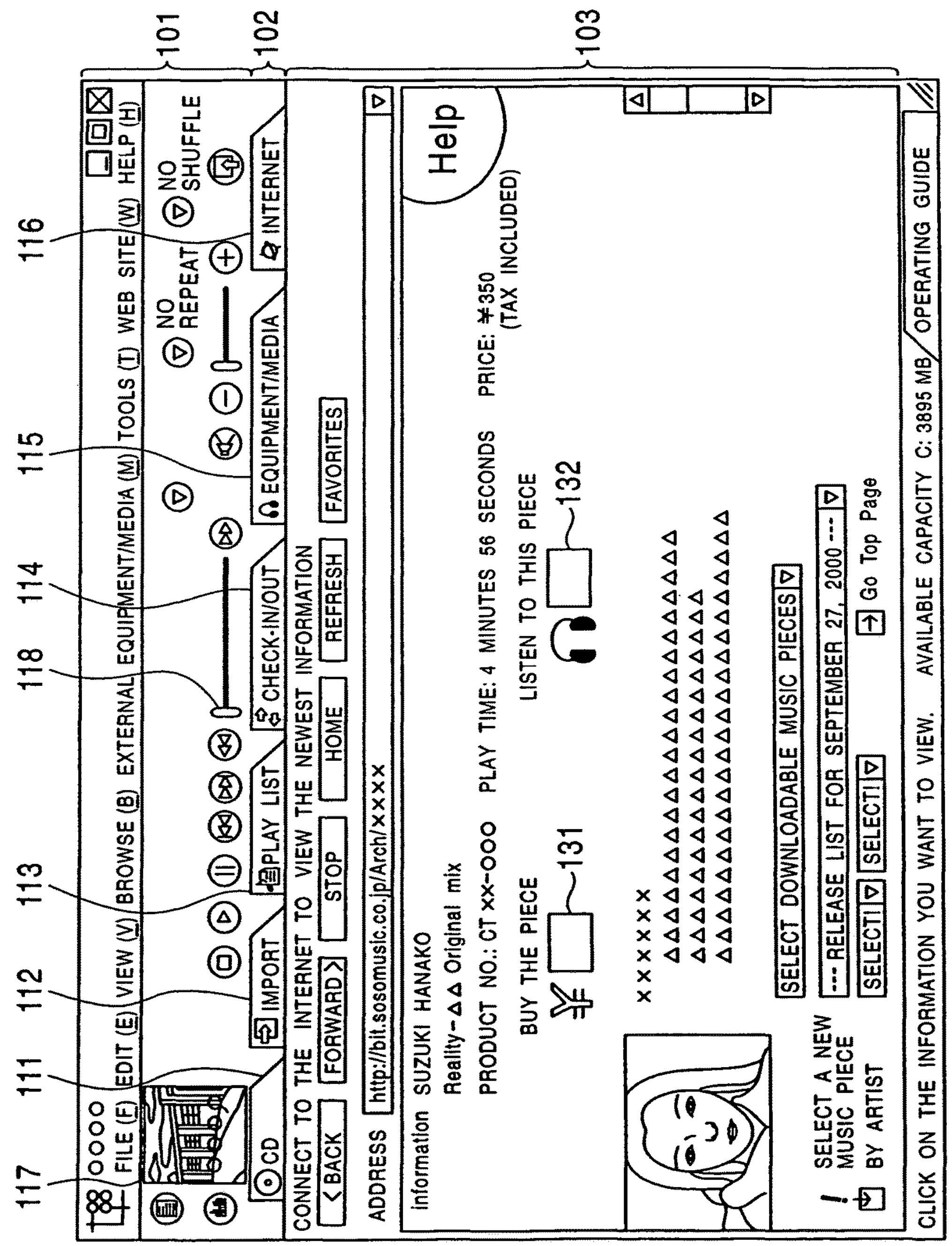
FIG. 9 is also a diagram for describing the procedures for purchasing or listening to a sample of the contents data.

For example, in the event that the user selects and clicks on the image 121-3, a detailed description of the contents comes up as shown in FIG. 9, and a Web page, containing a button 131 for proceeding to the purchasing processing for the corresponding contents, and a button 132 for listening to a sample of the corresponding contents, is displayed on the browser portion 103.

Figure 10:
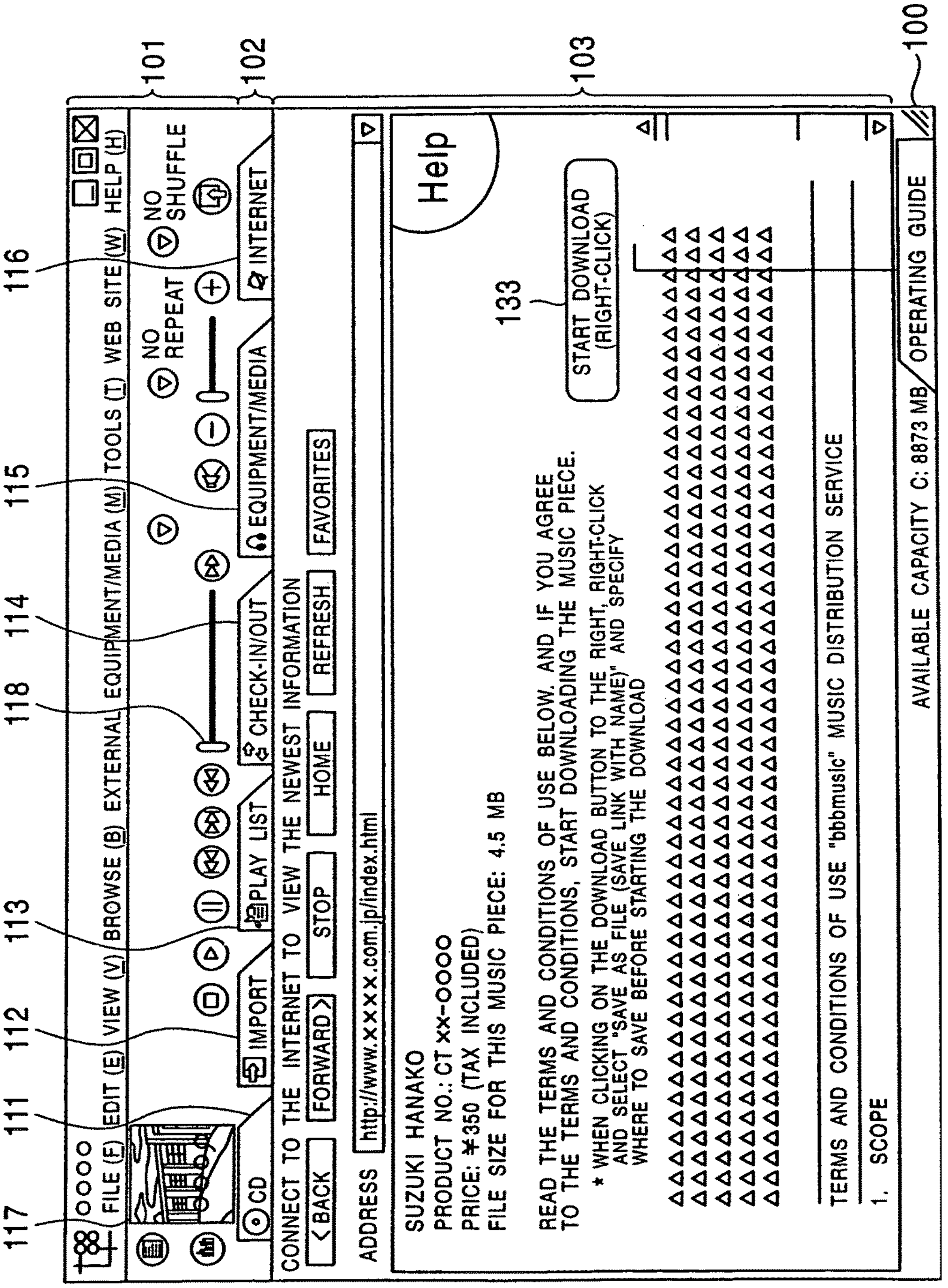
FIG. 10 is a diagram for describing the download screen.

In the event that the user presses the button 131, the download screen shown in FIG. 10 is displayed on the browser portion 103, and downloading of contents start by the user pressing the button 133.

Figure 11:
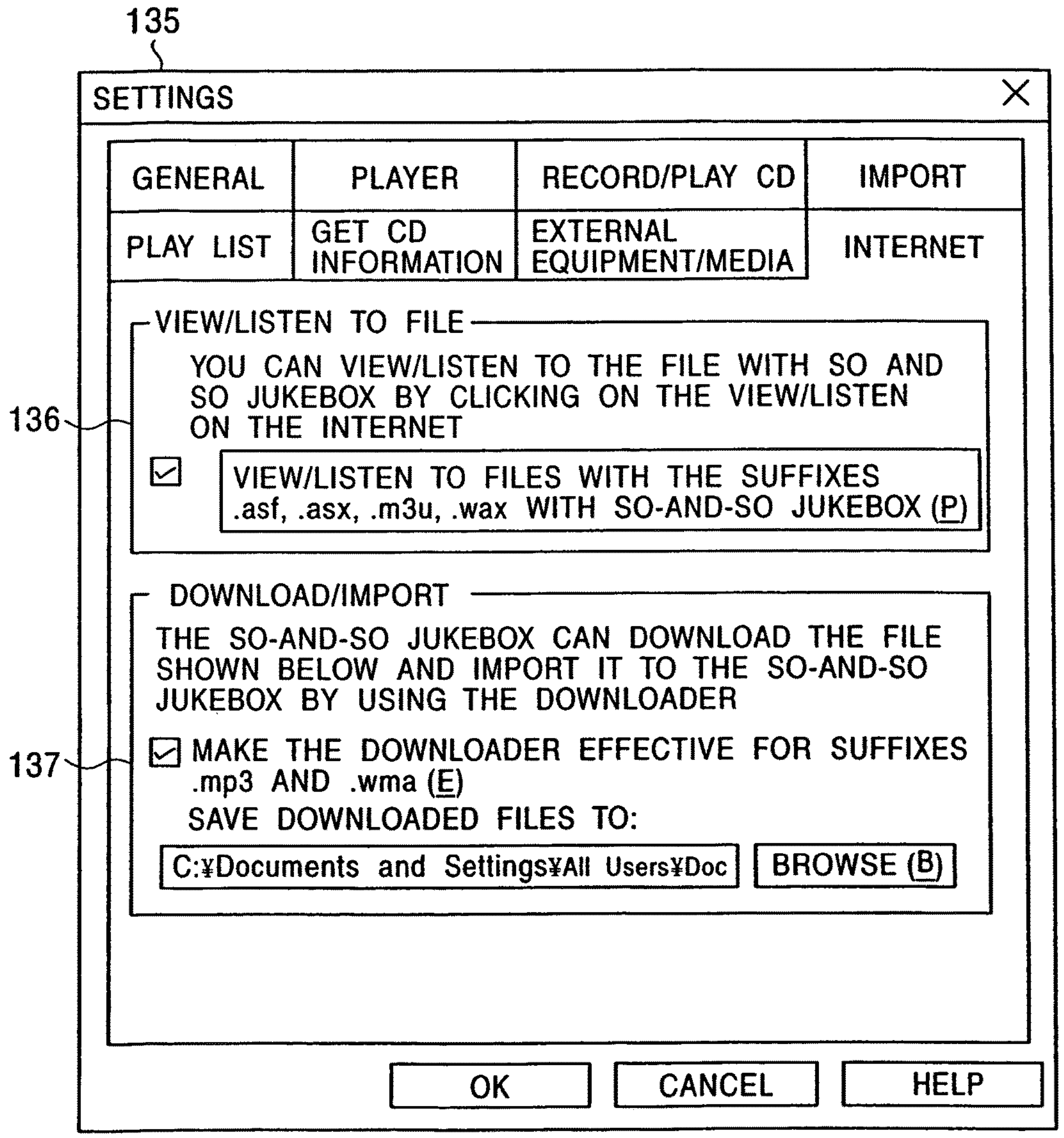
FIG. 11 is a diagram for describing the setting screen.

Also, the user can display the settings screen 135 shown in FIG. 11, by selecting "tools" from the player portion 101 and selecting "settings" therein, for example. In the event that the user checks the check box 136, the software is set such that in the event that the suffix of files correlated to the link text, link buttons or images or the like which the user clicks in the Web image displayed in the browser portion 103 is .asf, .asx, .m3u, or .wax, the files are not downloaded but played by the jukebox application. Also, in the event that the check box 137 is checked, the software is set such that in the event that the suffix of files correlated to the link text, link buttons or images or the like which the user clicks in the Web image displayed in the browser portion 103 is .mp3 or .wma, the files are downloaded. Also, the storage area to store the downloaded files can be set in this screen.

Next, the processing of the jukebox application in the event that the user has displayed a Web screen in the browser portion 103 will be described with reference to the flowchart shown in FIG. 12.

In step S1, the jukebox application program receives input of operations which the user has made using the keyboard 58 or the mouse 59, indicating a click on the Web page link displayed in the browser portion 103 on the display window 100.

In step S2, the jukebox application program judges whether or not the target address is an asf file or an m3u file.

In the event that judgment is made in step S2 that target address is an asf file or an m3u file, in step S3 the jukebox application program plays the target file without downloading, since asf files and m3u files are not downloadable files but listening contents files, and thus the processing ends. That is to say, the jukebox application program receives input of target file data, and outputs the audio data from the speaker 64, but the corresponding file is not recorded to a recording medium such as the HDD 61, for example.

Figure 13:
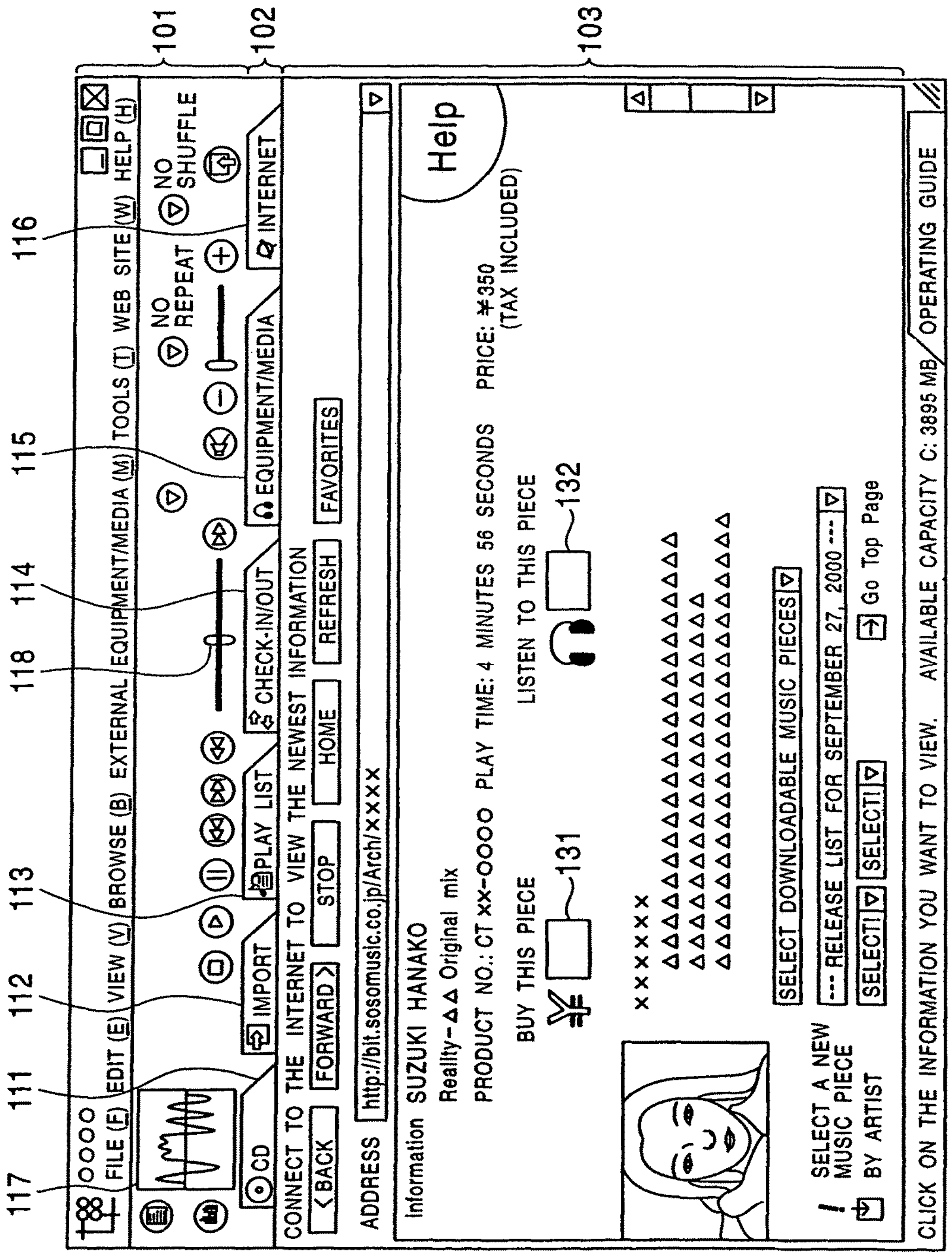
FIG. 13 is a diagram for describing the display screen in the case of listening to a sample of the contents data.

At this time, the jukebox application program may display in the field 117 in the player operating portion 101 an image indicating the signal level of the frequency bands of the audio being output (e.g., by octave) as shown in FIG. 13 (i.e., an image of a so-called spectral analyzer) or display an image indicating the signal level corresponding to elapsing of time of the audio being output, or move the lever 118 from the left in the figure toward the right according to the playing position of the contents, thereby indicating that contents data is being played by processing of the jukebox application program.

In the event that judgment is made in step S2 that target address is neither an asf file nor an m3u file, in step S4 the jukebox application program judges whether or not the target address is a wma file or an mp3 file.

Figure 14:
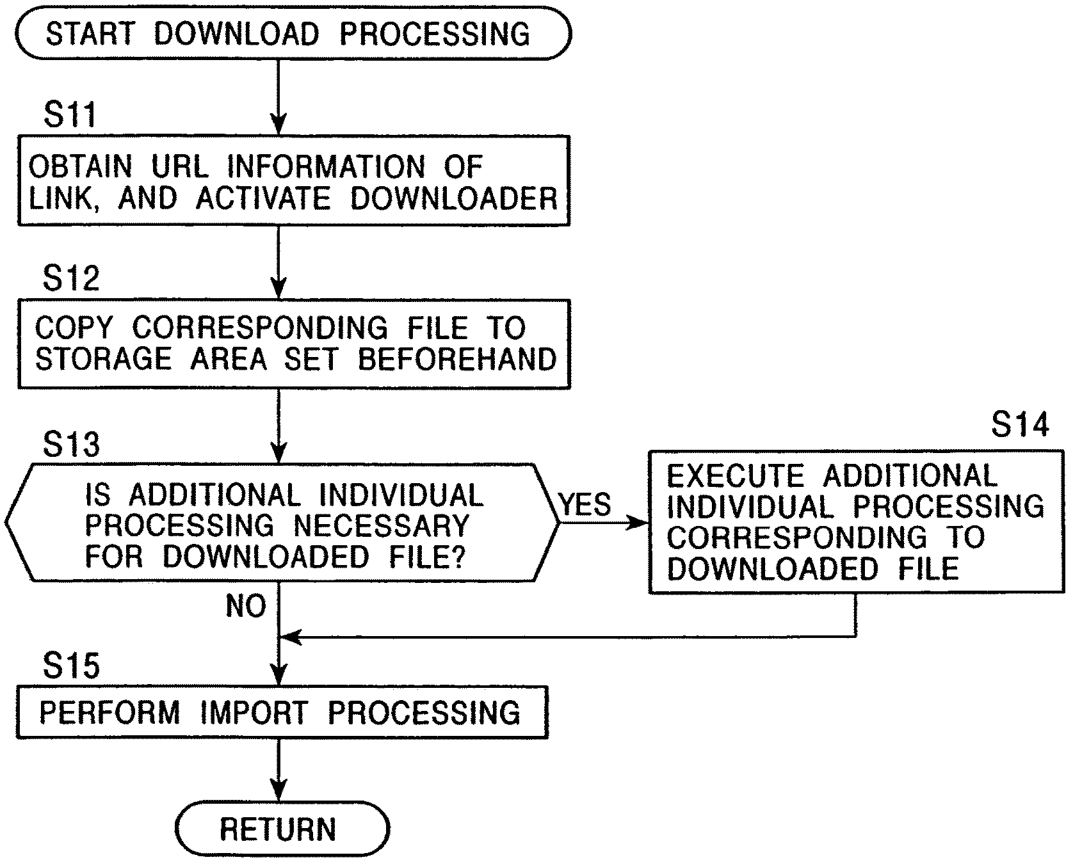
FIG. 14 is a flowchart for describing the downloading processing.

In the event that judgment is made in step S4 that target address is a wma file or an mp3 file, wma files and mp3 files are downloadable contents files, so in step S5 the jukebox application program executes the downloading processing described later with reference to FIG. 14, and the processing ends.

In the event that judgment is made in step S4 that target address is neither a wma file nor an mp3 file, the link which the user has clicked on is not linked to a contents file, so in step S6 the jukebox application program performs Web browsing (i.e., jumping to the specified page or the like) based on the information of the link which the user has clicked on, and the processing ends.

Thus, according to this arrangement, whether a contents file is for listening or for downloading is distinguished from the target address of a link, and whether to execute playing processing or downloading processing is determined based on the distinguishing results, so there is no need for the user to perform multiple operations, thereby providing an application which is readily usable by the user.

Next, the downloading processing executed in step S5 in FIG. 12 will be described with reference to the flowchart shown in FIG. 14.

Figure 12:
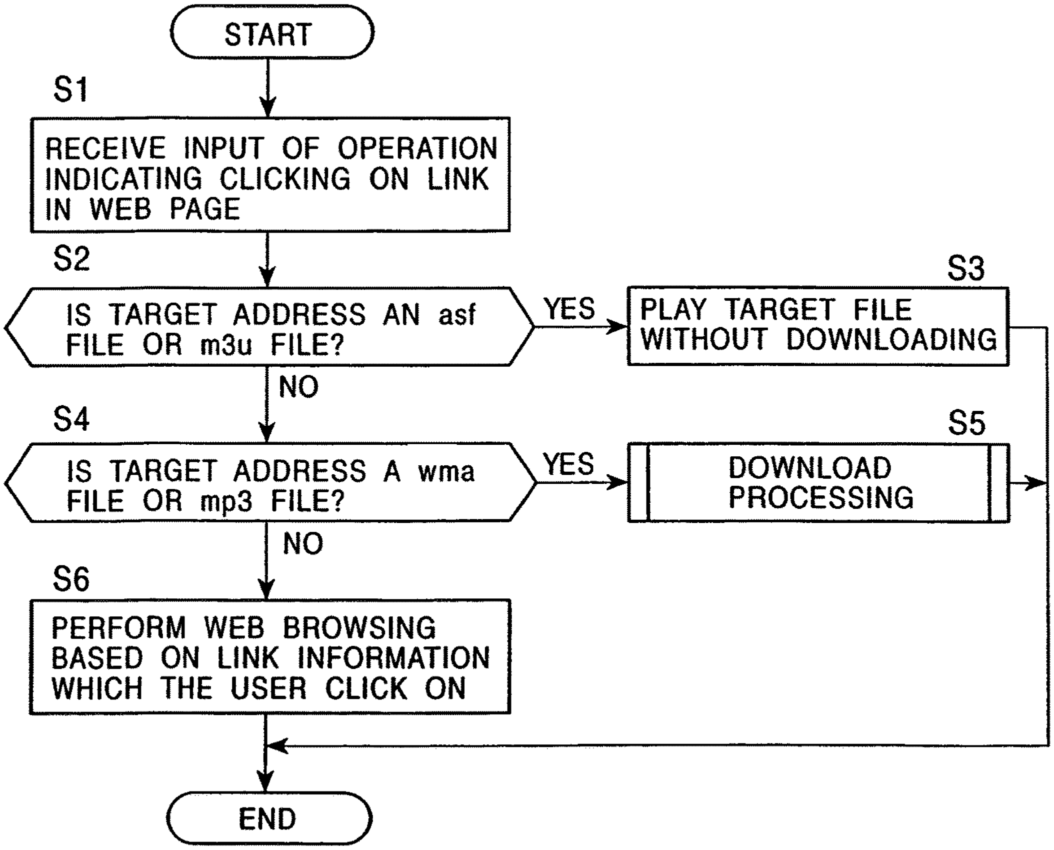
FIG. 12 is a flowchart for describing the processing of the jukebox application in the event that a Web screen is displayed on the browser portion.
Figure 15:
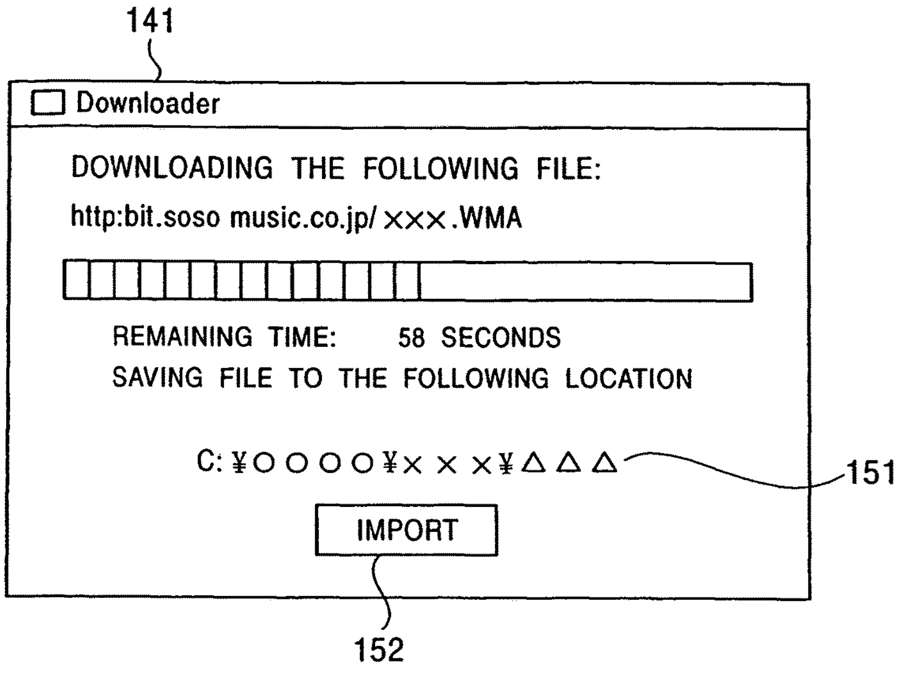
FIG. 15 is a diagram for describing a dialog box displayed while downloading contents.

In step S11, the jukebox application program obtains the URL information of the link which the user has clicked on in step S1 in FIG. 12, and activates downloading. FIG. 15 shows a dialog box 141 which comes up in the event that downloading has been activated. The path shown in the path displaying unit 151 within the dialog box 141 is the path to the download destination of the file, that has been set with the settings screen 135 already described with reference to FIG. 10.

In step S12, the jukebox application program copies (i.e., downloads) the corresponding file to the storage area set beforehand (i.e., to the storage area indicated by the path displayed by the path displaying unit 151 within the dialog box 141 shown in FIG. 15).

Upon the download of the corresponding file having been completed, a message (e.g., "Download completed") is displayed in the dialog box 141 shown in FIG. 15, to notify the user of completion of the download.

In step S13, the jukebox application program judges whether or not individual processing is additionally necessary for the downloaded file. For example, in the event that the downloaded file is a pay contents file, the downloaded file cannot be played unless contents purchasing processing or the like is performed with regard to the contents vendor to obtain a predetermined encryption key. The jukebox application program judges whether or not individual processing such as contents purchasing processing is necessary, based on information listed in the usage conditions file attached to the downloaded contents file.

In step S13, in the event that judgment is made that individual processing is necessary, individual processing is executed corresponding to the downloaded file in step S14.

Figure 16:
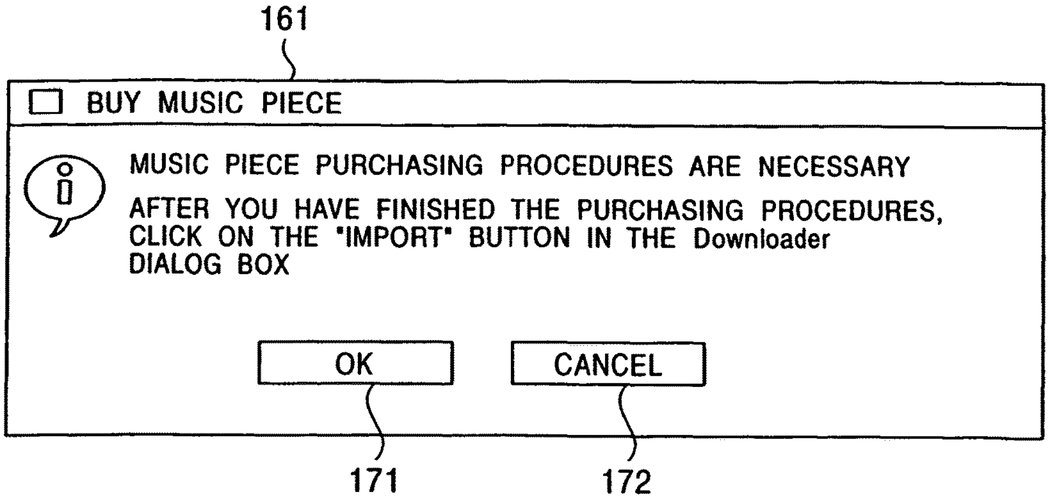
FIG. 16 is a diagram for describing a dialog box notifying the user that purchasing procedures are necessary.
Figure 17:
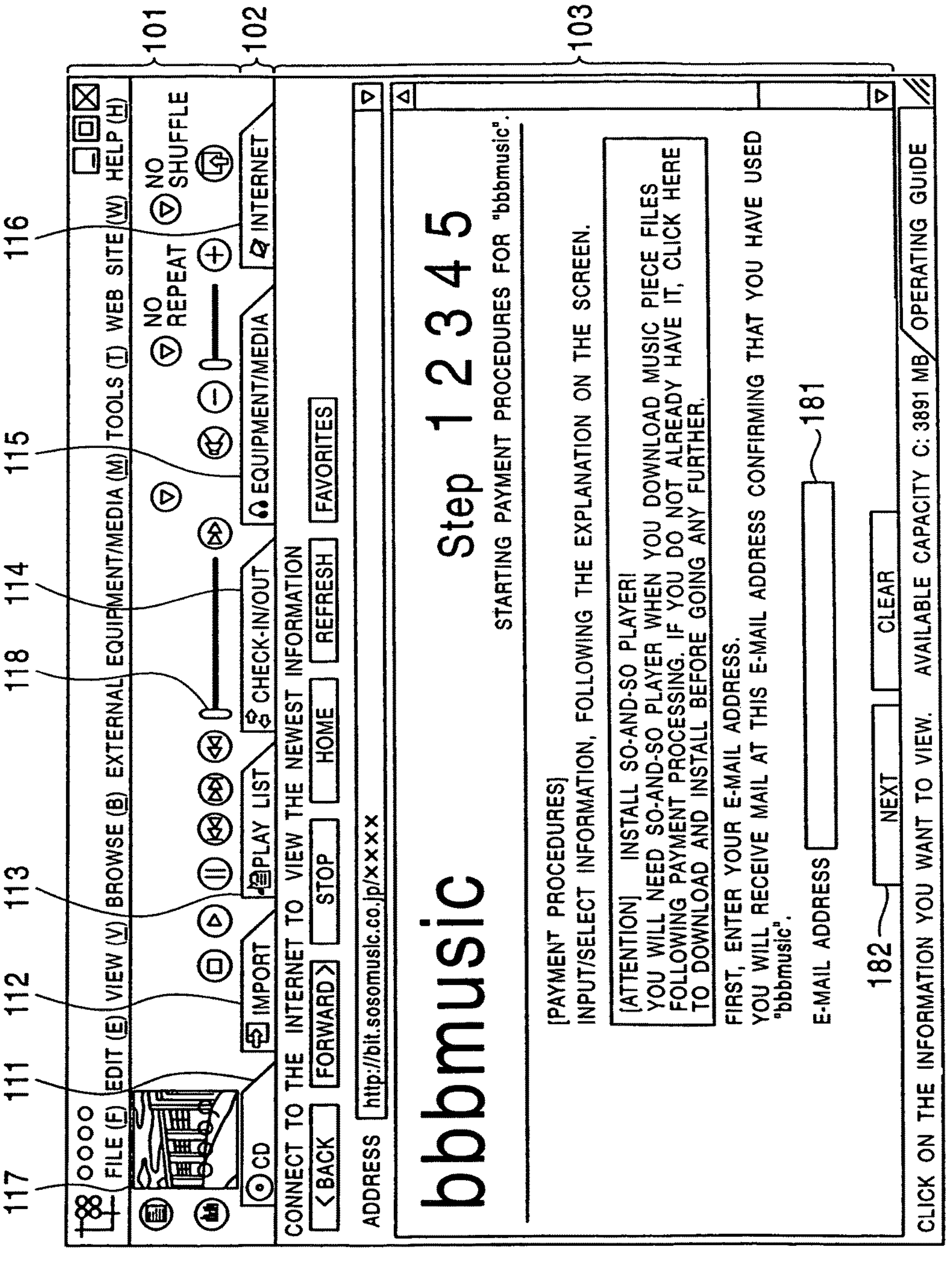
FIG. 17 is a diagram for describing the purchasing procedures.

Specifically, the user is notified by the jukebox application program displaying the dialog box 161 shown in FIG. 16 that in order for the downloaded contents to be imported to the jukebox and played or moved to a PD, music piece purchasing processing must be carried out. In the event that the user clicks the OK button 171, the Web screen for purchasing processing shown in FIG. 17 is displayed in the browser unit 103. In the event that the user clicks the cancel button 172, the music piece purchasing processing is cancelled. As long as the music piece purchasing processing is not carried out, the downloaded contents data cannot be played even if playing operations are executed on the play list, neither can the contents be checked-out to a PD or another personal computer.

The user executes the contents purchasing processing (e.g., instructing payment method, etc.) following the instructions on the purchasing processing Web screen displayed in the browser portion 103 shown in FIG. 17. In the event that the contents purchasing processing ends normally, the contents vendor sends an encryption key or the like corresponding to the contents data which the user has downloaded, to the personal computer 31 of the user via the network 32, so the jukebox application program can decrypt the contents using the received encryption key (i.e., the contents can be played).

In the event that judgment is made in step S13 that individual processing is not necessary (e.g., in the event that the downloaded contents data is copyright-free or is free-of-charge contents, arranged such that the contents can be played simply by downloading), or, following completion of the processing in step S14, the jukebox application program performs importing processing in step S15, and the processing ends.

Figure 18:
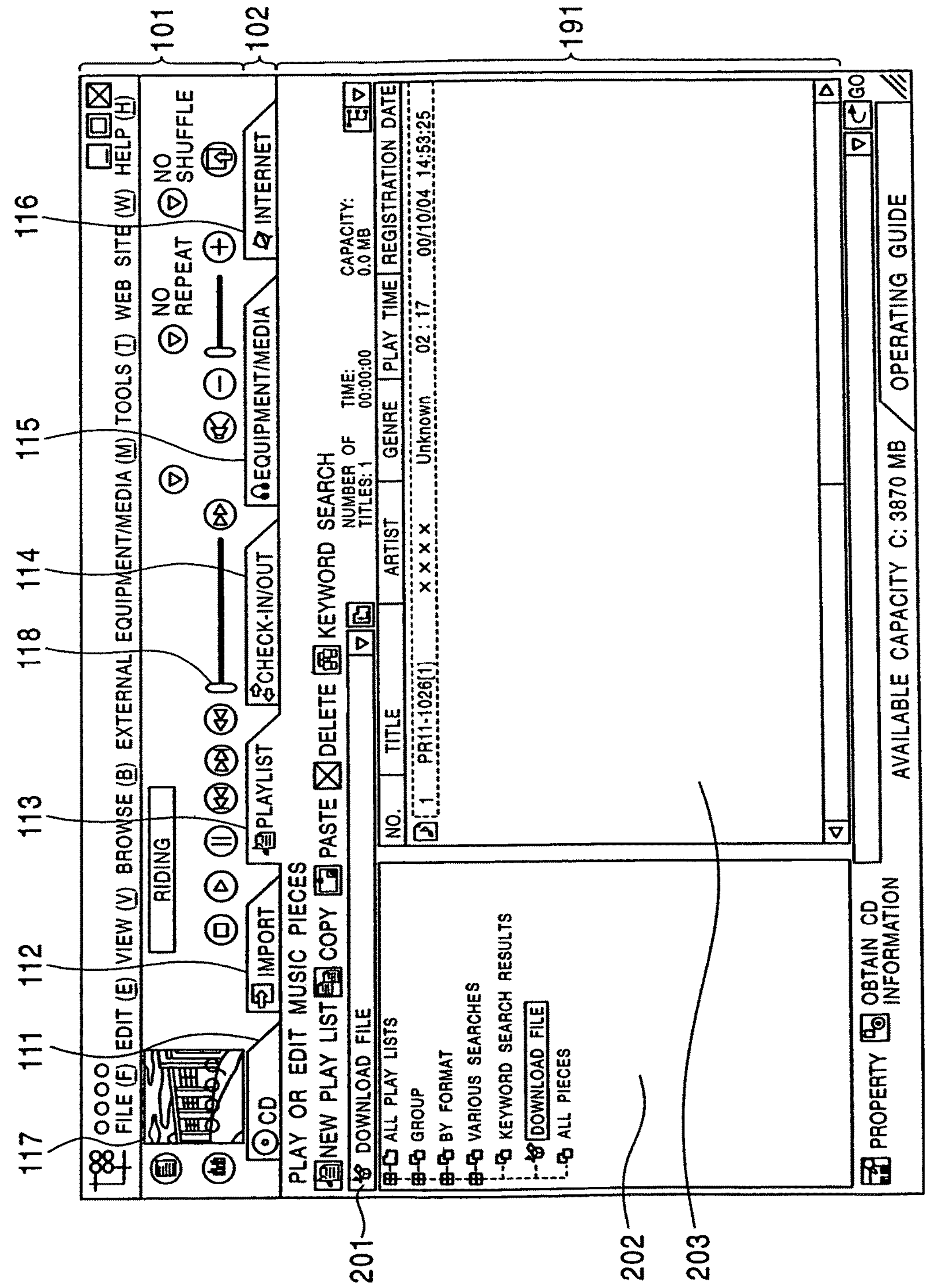
FIG. 18 is a diagram for describing the play list area wherein the downloaded contents are displayed.

Following completion of the importing processing, in the event that the user selects the tab 113 to display the play list, and selects "download file" in the tree display area 202 of the play list display area 191 as shown in FIG. 18, the contents that have downloaded and regarding which importing processing has been completed are displayed in the contents display area 203 of the play list display area 191. The imported contents can be played with the jukebox application program, or can be checked-out to the portable devices 36-1 through 36-3.

Thus, downloaded contents files are saved in a storage area that has been set beforehand, so there is no need for the user to search for downloaded files following downloading of contents files, or to perform operations for moving the contents files to storage areas where processing such as playing can be carried out using the application which the user desires such as a jukebox application program or the like.

Also, in the event that predetermined processing such as rights purchasing processing is necessary based on the downloaded contents file, this is detected, notified to the users, and importing processing for the downloaded file is also performed automatically, so the user can enjoy the downloaded contents without being required to perform troublesome operations.

Now, with regard to the processing described with reference to FIG. 14, judgment is made regarding whether or not there is the need to perform rights purchasing processing for the downloaded contents (i.e., receiving an encryption key corresponding to the contents), and in the event that rights purchasing processing is necessary, importing processing of the contents is carried out following completion of the rights purchasing processing; however, an arrangement may be made wherein importing processing of the contents is executed at the time of downloading the contents, and in the event that rights purchasing processing is necessary, the rights purchasing processing is performed following completion of the importing processing. In this case, playing processing or check-out processing of the downloaded contents cannot be performed unless the rights purchasing processing is performed following importing.

The above-described series of processes can be executed by software as well. In the event of executing the series of processes by software, the program making up the software is provided in dedicated hardware which is assembled into a computer, or is installed to, for example, a general-purpose personal computer, capable of executing various functions by installing various types of programs, from a recording medium.

This storing medium, as shown in FIG. 5, comprises packaged media to be distributed to the user separately from the computer, in order to provide the program thereto, such as magnetic disks 66 (including floppy disks), optical disks 67 (CD-ROMs (Compact Disk Read-Only Memory), DVDs (Digital Versatile Disks), etc.), magneto-optical disks 68 (including MDs (Mini-Disks)), or semiconductor memory 69 or the like, upon which the program is recorded.

In the present specification, the steps describing the programs stored in the storing medium may of course be executed in the time sequence following the order in which they are listed, but are not restricted to being executed in this time sequence, and may be executed in parallel or individually.

Also, in the present specification, the term "system" represents all equipment made up of multiple devices.

With the information processing apparatus, information processing method, and program stored in a program storing medium, according to the present invention, information is input from another information processing apparatus, an input Web page is displayed, signals corresponding to operations made by the user with regard to the displayed Web page are output to the other information processing apparatus, the suffix of the input contents data is distinguished, and in the event that the suffix of the contents data is distinguished as being a first suffix, the contents data is played, while in the event that the suffix of the contents data is distinguished as being a second suffix, the contents data and information relating to the contents data is saved. Accordingly, contents data can be played for listening to samples, or can be downloaded, without requiring the user to perform multiple operations.

What is claimed is:

1. An information processing apparatus to receive distributed content data from a server via a network, the information processing apparatus comprising:

processor configured to:

control a display of a content player, the content player including a first area to switch between displaying a playlist, displaying a content data distribution service website, and displaying a connected apparatus;

control said displaying of the content data distribution service website, wherein the content player includes a second area, wherein the content data distribution service website is displayed within the second area of the content player, and wherein said displaying the content data distribution service website within the second area of the content player includes displaying a weblink of the content data distribution service website within the second area of the content player and includes displaying a webpage corresponding to the weblink within the second area of the content player;

determine whether a selected content data from the content data distribution service website corresponds to a first data format or a second data format;

play the selected content data without downloading the selected content data when the selected content data corresponds to the first data format;

download, via the network, the selected content data when the selected content data corresponds to the second data format; and perform web browsing corresponding to the selected content data when the selected content data does not correspond to the first data format and the second data format.

2. The information processing apparatus according to claim 1, wherein the selected content data is designated as to be purchased by a user.

3. The information processing apparatus according to claim 2, wherein contents purchased and downloaded are displayed together in a group on a display.

4. The information processing apparatus according to claim 1, further comprising a storage device that stores downloaded contents in a storage area indicated by a predetermined path prior to selection of a corresponding content for download.

5. The information processing apparatus according to claim 1, wherein the circuitry is configured to receive information relating to downloaded content, and wherein a storage device is configured to store the information relating to the downloaded content with the downloaded content.

6. The information processing apparatus according to claim 5, wherein the circuitry is configured to transmit the downloaded content and the information relating to the downloaded content.

7. The information processing apparatus according to claim 1, further comprising a storage device configured to store image data corresponding to downloaded content with the downloaded content.

8. The information processing apparatus according to claim 7, wherein, in response to selecting the downloaded content for playback, via the play list, the circuitry is configured to control a display of the image data corresponding to the downloaded content.

9. The information processing apparatus according to claim 1, wherein the circuitry is configured to receive an instruction from a user to download the selected content data, download the selected content data, and transmit a command to the content player to import the downloaded selected content data into the play list in response to the selected content data being downloaded.

10. The information processing apparatus according to claim 9, wherein the circuitry is configured to download the selected content data to a predefined destination path of a storage device, and transmit, as part of the command, the predefined destination path to the content player for the content player to import the downloaded selected content data into the playlist.

11. The information processing apparatus according to claim 1, wherein the content player alternatively displays the play list and the webpage within the second area of the content player, based on an operation of selecting a corresponding selectable item from the first area of the content player, via tabbed pages.

12. The information processing apparatus according to claim 1, wherein the content player alternatively displays the play list and the webpage within the second area of the content player, based on an operation of selecting a corresponding selectable item from the first area of the content player.

13. The information processing apparatus according to claim 12, wherein the content player includes content playback controls, which are displayed when the content player displays the playlist and when the content player displays the webpage.

14. The information processing apparatus according to claim 1, wherein the circuitry is configured to receive, via the network, file data to play the selected content data without downloading the selected content data using the content player when the selected content data corresponds to the first data format.

15. The information processing apparatus according to claim 1, wherein the content player includes an image indicating a signal level of a content being played using the content player.

16. The information processing apparatus according to claim 1, wherein the first data format and the second data format are types of digital data compression formats.

17. A method for receiving distributed content data from a server via a network, the method comprising:

controlling, using circuitry, a display of a content player, the content player including a first area to switch between displaying a playlist, displaying a content data distribution service website, and displaying a connected apparatus;

controlling said displaying of the content data distribution service website, wherein the content player includes a second area, wherein the content data distribution service website is displayed within the second area of the content player, and wherein said displaying the content data distribution service website within the second area of the content player includes displaying a weblink of the content data distribution service website within the second area of the content player and includes displaying a web page corresponding to the weblink within the second area of the content player;

determining, using the circuitry, whether a selected content data from the content data distribution service website corresponds to a first data format or a second data format;

playing the selected content data without downloading the selected content data when the selected content data corresponds to the first data format;

downloading, via the network, the selected content data when the selected content data corresponds to the second data format; and performing web browsing corresponding to the selected content data when the selected content data does not correspond to the first data format and the second data format.

18. A non-transitory computer-readable medium encoded with instructions that, when executed by a processor, cause the processor to perform a method for receiving distributed content data from a server via a network, the method comprising:

controlling a display of a content player, the content player including a first area to switch between displaying a playlist, displaying a content data distribution service website, and displaying a connected apparatus;

controlling a display said displaying of the content data distribution service website, wherein the content player includes a second area, wherein the content data distribution service website is displayed within the certain second area of the content player, and wherein said displaying the content data distribution service website within the second area of the content player includes displaying a weblink of the content data distribution service website within the second area of the content player and includes displaying a webpage corresponding to the weblink within the second area of the content player;

determining whether a selected content data from the content data distribution service website corresponds to a first data format or a second data format;

playing the selected content data without downloading the selected content data when the selected content data corresponds to the first data format;

downloading, via the network, the selected content data when the selected content data corresponds to the second data format; and performing web browsing corresponding to the selected content data when the selected content data does not correspond to the first data format and the second data format.

* * * * *